United States Patent
Fujita et al.

(10) Patent No.: US 10,006,788 B2
(45) Date of Patent: Jun. 26, 2018

(54) RADIAL LINE DIAL PLATE AND AUTOMOBILE METER PROVIDED WITH RADIAL LINE DIAL PLATE

(71) Applicant: YAZAKI CORPORATION, Tokyo (JP)

(72) Inventors: Sunao Fujita, Shizuoka (JP); Hajime Tsuruta, Yamagata (JP); Yusuke Awano, Yamagata (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 285 days.

(21) Appl. No.: 15/149,766

(22) Filed: May 9, 2016

(65) Prior Publication Data
US 2016/0252373 A1    Sep. 1, 2016

Related U.S. Application Data

(63) Continuation of application No. PCT/JP2014/083033, filed on Dec. 12, 2014.

(30) Foreign Application Priority Data

Dec. 12, 2013  (JP) .................................. 2013-257019
Dec. 20, 2013  (JP) .................................. 2013-264122

(51) Int. Cl.
*G01D 13/04* (2006.01)
*B60K 35/00* (2006.01)
*F21V 8/00* (2006.01)

(52) U.S. Cl.
CPC ............. *G01D 13/04* (2013.01); *B60K 35/00* (2013.01); *G02B 6/0038* (2013.01)

(58) Field of Classification Search
CPC ........ B60K 35/00; G01D 11/28; G01D 13/04; G02B 6/00; G02B 6/0038
(Continued)

(56) References Cited

U.S. PATENT DOCUMENTS 6,755,546 B2 *  6/2004  Ohkawa ................ G01D 11/28
                                                   362/23.15
8,065,973 B2 * 11/2011  Suzuki ................... G01D 11/28
                                                   116/46

(Continued)

FOREIGN PATENT DOCUMENTS

GB    1391230 A  *  4/1975 ............. G04B 19/10
JP    8-21749 A      1/1996
(Continued)

OTHER PUBLICATIONS

International Search Report of PCT/JP2014/083033 dated Mar. 17, 2015.

*Primary Examiner* — Richard A Smith
(74) *Attorney, Agent, or Firm* — Sughrue Mion, PLLC (57) ABSTRACT

A radial line dial plate includes: a substrate body made of resin on which a radial line mark region is molded by a die mark-molding-face of a molding die; a plurality of fine grooves that extend radially outward in a radial direction from a center of the radial line mark region without intersecting with each other and are formed such that a distance therebetween is 1 μm or less at an outermost peripheral end to give a radial line pattern to the radial line mark region; and a metal thin film that is deposited to at least the radial line mark region of the substrate body.

14 Claims, 11 Drawing Sheets

(58) Field of Classification Search
USPC .......................................... 116/286, 287, 334
See application file for complete search history.

(56) References Cited

U.S. PATENT DOCUMENTS

| | | |
|---|---|---|
| 2002/0189526 A1 | 12/2002 | Sugimoto |
| 2008/0213546 A1 | 9/2008 | Murata et al. |
| 2013/0040090 A1 | 2/2013 | Sakurai |
| 2017/0072800 A1* | 3/2017 | Fujita .................... B60K 35/00 |
| 2017/0282716 A1* | 10/2017 | Mochizuki et al. ..... B60Q 3/14 |

FOREIGN PATENT DOCUMENTS

| | | |
|---|---|---|
| JP | 2003-4495 A | 1/2003 |
| JP | 2006-208221 A | 8/2006 |
| JP | 2007-249028 A | 9/2007 |
| JP | 2009-282101 A | 12/2009 |
| JP | 4543046 B2 | 9/2010 |
| JP | 2013-40773 A | 2/2013 |

* cited by examiner

RADIAL LINE DIAL PLATE AND AUTOMOBILE METER PROVIDED WITH RADIAL LINE DIAL PLATE

CROSS-REFERENCE TO RELATED APPLICATION

This application is a continuation application of International Application No. PCT/JP2014/083033 filed on Dec. 12, 2014, claiming priority based on Japanese Patent Application Nos. 2013-257019 filed Dec. 12, 2013, 2013-264122, filed Dec. 20, 2013, the contents of all of which are incorporated herein by reference in their entirety.

BACKGROUND OF THE INVENTION

1. Field of the Invention

The present invention relates to a radial line dial plate and an automobile meter provided with the radial line dial plate.

2. Description of the Related Art

For a dial plate to be used in, for example, automobile meters under severe environmental conditions due to heat, vibration, or the like, there is known a dial plate produced by a metal such as stainless steel or aluminum such that the automobile meters have metallic feeling, high-grade feeling, or decorativeness (see Japanese Patent Application Laid-open No. 2003-4495 and the like). In the dial plate disclosed in the literature, a plate member is made of a metal and radial line marks are applied to the surface thereof.

Radial line marking is performed by marking of fine grooves on a metallic surface by a brush or the like, and radial gloss occurs on the surface of a metallic dial plate by external light reflected onto the grooves. In the marking by the brush, the brush is stroked in a direction closer to the center of the metallic dial plate, and the fine grooves are formed on the surface. At the same time, the dial plate is rotated. That is, after the brush is stroked, the dial plate is rotated at very small angle, and the subsequent stroke is performed.

In the dial plate made of the metal, radial line mark treatment is required to be performed for each sheet of metal plates by a brush, and there are problems in terms of obtaining a uniform quality and in terms of manufacturing costs. In addition, since the dial plate is made of the metal, it is heavy in weight, which is disadvantageous to weight reduction in vehicle, especially.

Therefore, a metallic-tone dial plate has been proposed in which metallic feeling is created using a transparent synthetic resin such as an acrylic resin or polycarbonate (for example, see Japanese Patent Application Laid-open No. 2013-40773). In the metallic-tone dial plate disclosed in Japanese Patent Application Laid-open No. 2013-40773, a dial plate body is molded by a synthetic resin and is provided with a smooth surface and a concave-convex surface on the surface thereof. Then, a metal layer is formed on the smooth surface and the concave-convex surface of the dial plate body by surface treatment such as vapor deposition, plating, or painting. Thus, it is possible to produce the metallic-tone dial plate formed with the smooth surface and the concave-convex surface without processing the metallic plate and to provide the dial plate, which can create the metallic feeling, at a low cost.

In a conventional marking method, however, a plurality of marks corresponding to a width of the brush are applied at the same time with a single stroke. The marking due to the previous stroke is marking on a straight line directed to the center of the dial plate, which is the same as in the next stroke. Therefore, numerous intersection points appear through the marking of the previous stroke and the next stroke. In the radial line marks in which numerous intersection points appear, white gloss appears and thus feeling of metal working is reduced. In addition, as described above, when the marking due to the fine grooves is performed for each sheet of metallic dial plates by the brush or the like, it is not entirely suited to mass production of the same radial line pattern, and material costs and manufacturing costs also increase to high cost. Furthermore, the metallic dial plate is heavy in weight, which is disadvantageous to weight reduction in the case of being used in automobile meters for a vehicle, especially.

Furthermore, in the above-described metallic-tone dial plate using the synthetic resin, a dial plate body is integrally molded using a molding die. A molding die portion for molding the concave-convex surface (die mark-molding-face) can be finished to be a concave-convex surface by embossing. Alternatively, the die mark-molding-face may be provided with spin hairline-shaped irregularities, and it is considered that the embossing may not be performed when roughness of a polished surface is rough more than of the smooth surface.

However, if the die mark-molding-face is formed by a processing method such as a brush process (hairline), embossing, or polishing, when a plurality of molding dies are produced, a problem occurs in that metallic tone differs for each molding die.

SUMMARY OF THE INVENTION

In view of the circumstances described above, one object of the present invention is to provide a radial line dial plate and an automobile meter provided with the radial line dial plate, which gives appearance as if being manufactured by cutting a real metal to a viewer while being a molded resin product and can be obtained at lower cost compared to a metal cutting product.

Other object of the present invention is to provide a lightweight and inexpensive radial line dial plate and an automobile meter provided with the radial line dial plate, which can obtain appearance with a uniform quality as if a radial line pattern is applied to a real metallic plate while being a molded resin product.

To achieve the above-described objective, a radial line dial plate according to one aspect of the present invention includes a substrate body made of resin on which a radial line mark region is molded by a die mark-molding-face of a molding die; a plurality of fine grooves that extend radially outward in a radial direction from a center of the radial line mark region without intersecting with each other and are formed such that a distance therebetween is 1 μm or less at an outermost peripheral end to give a radial line pattern to the radial line mark region; and a metal thin film that is deposited to at least the radial line mark region of the substrate body.

According to another aspect of the present invention, in the radial line dial plate, it is preferable that the grooves are configured such that a depth between adjacent grooves is different.

According to still another aspect of the present invention, in the radial line dial plate, it is preferable that the substrate body is molded by a resin material having excellent transferability.

To achieve the above-described objective, a radial line dial plate according to still another aspect of the present invention includes a substrate body made of resin that is integrally molded by a molding die; and a metal thin film that is deposited to at least the radial line mark region provided on a surface of the substrate body, wherein the radial line mark region extends in a radial direction from a center of the substrate body and is formed into a radial line pattern shape by a large number of groove portions which are random in groove depth, respectively.

According to still another aspect of the present invention, in the radial line dial plate, it is preferable that the groove portions are randomly formed to have a groove depth of 1 µm as a maximum value or less.

According to still another aspect of the present invention, in the radial line dial plate, it is preferable that a large number of mountain portions formed between the groove portions are formed at a constant pitch.

According to still another aspect of the present invention, an automobile meter is provided with the radial line dial plate.

The present invention has been described above in brief. Further, the details of the present invention will become more apparent by reading through a mode for carrying out the invention (hereinafter, referred to as an "embodiment") to be described below with reference to the accompanying drawings.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below with reference to the accompanying drawings.

First Embodiment

First, a radial line dial plate and an automobile meter provided with the radial line dial plate according to a first embodiment of the present invention will be described with reference to FIGS. 1A to 7.

Figure 1A:
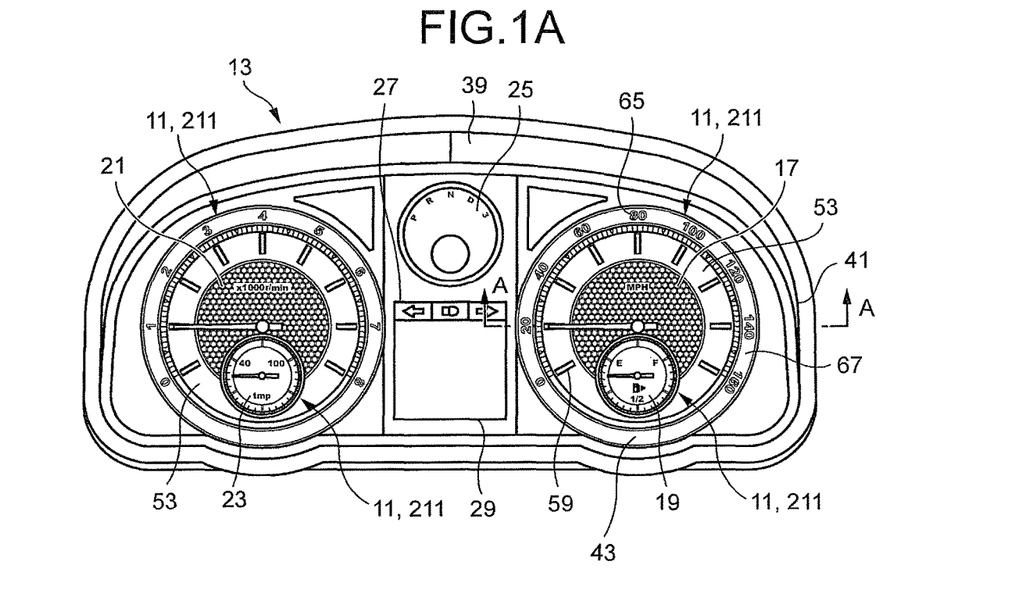
FIG. 1A is a front view of a vehicle combination meter provided with a radial line dial plate according to a first embodiment of the present invention.
Figure 1B:
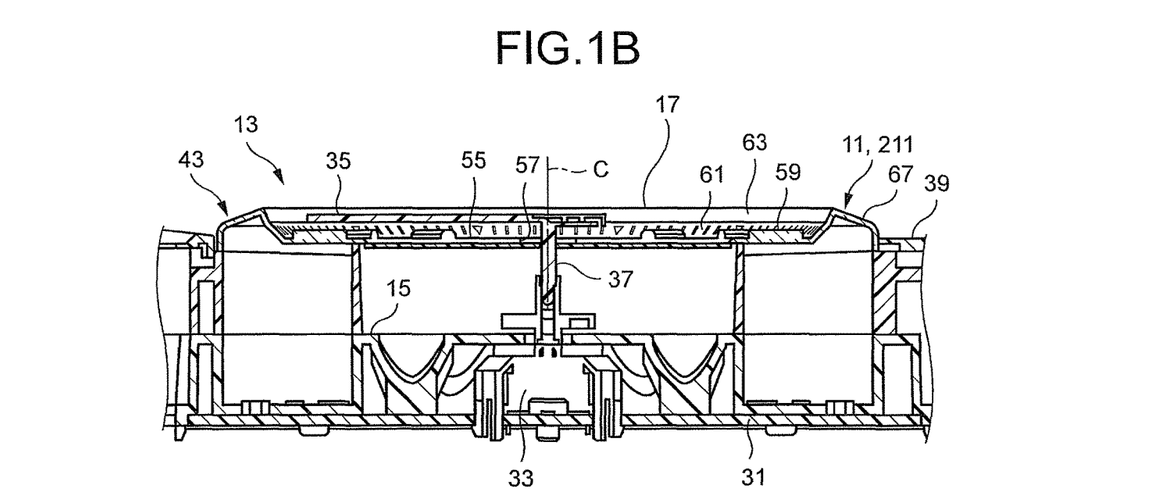
FIG. 1B is a cross-sectional view taken along line A-A in FIG. 1A.

As illustrated in FIGS. 1A and 1B, a vehicle combination meter 13 provided with a radial line dial plate 11 according to an embodiment of the present invention includes a case 15, a speedometer 17, a fuel gauge 19, a tachometer 21, a water temperature gauge 23, a shift display portion 25, a turn display portion 27, and a multi-display portion 29. For example, an inner mechanism (meter unit) 33 of the speedometer 17 and the tachometer 21 are fixed to a wiring board 31. A rotation shaft 37 of a pointer 35 is projected into the inner mechanism 33. A facing member 39 is attached to the case 15 and the facing member 39 covers, for example, the wiring board 31 or the inner mechanism 33 such that above-described various types of meters are exposed from an opening. A front side of the facing member 39 is further covered by a transparent cover 41 attached to the case 15.

The radial line dial plate 11 according to this embodiment can be applicable to the speedometer 17, the tachometer 21, the fuel gauge 19, and the water temperature gauge 23 which are automobile meters in the above-described vehicle combination meter 13. In this embodiment, an example of the radial line dial plate 11 used in the speedometer 17 will be described below.

Figure 2A:
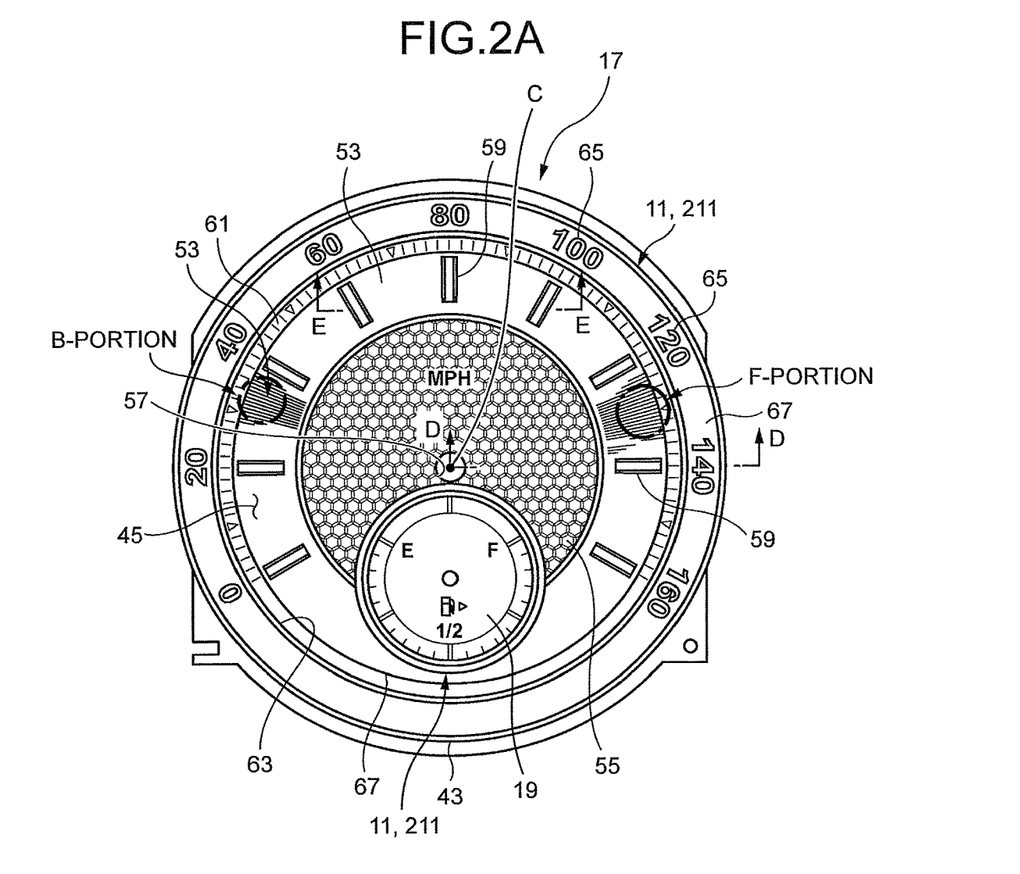
FIG. 2A is a front view of a speedometer illustrated in FIGS. 1A and 1B.
Figure 2B:
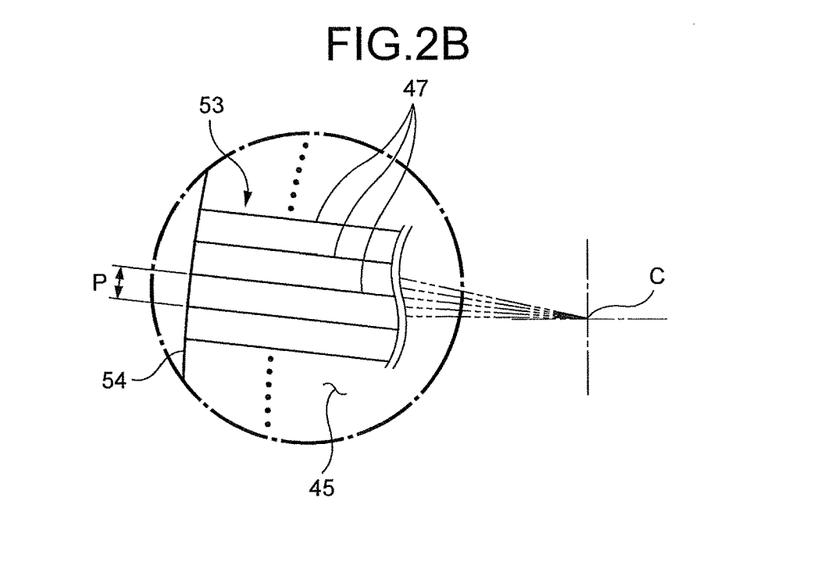
FIG. 2B is a partially enlarged view of a radial line mark region in a portion of B in FIG. 2A.
Figure 3A:
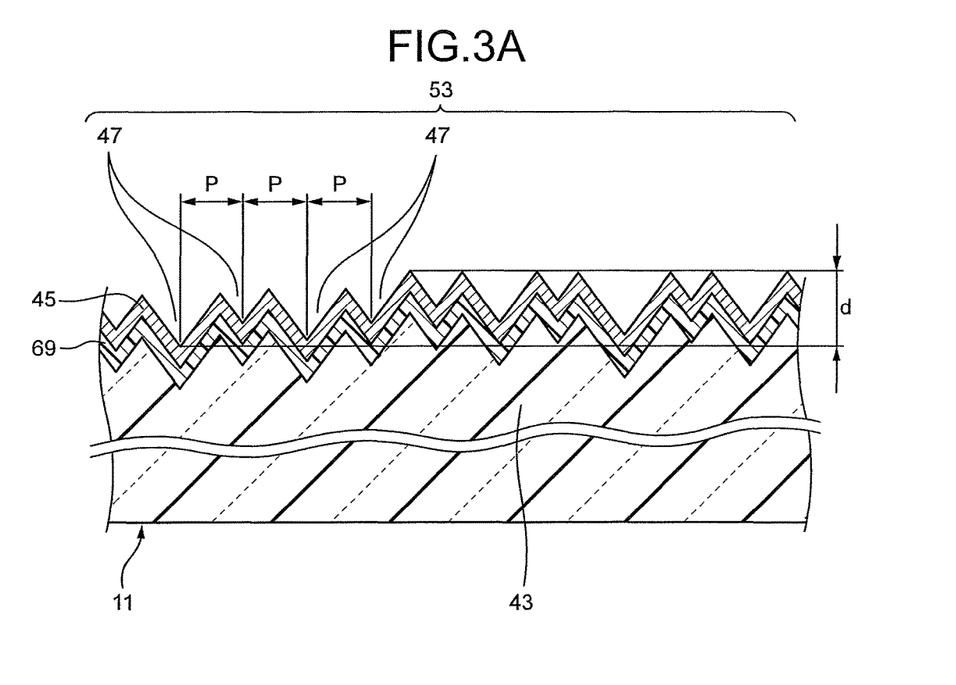
FIG. 3A is a cross-sectional view for schematically explaining a groove forming a radial line pattern of a radial line dial plate.

As illustrated in FIGS. 1A, 1B, 2A, and 2B, the radial line dial plate 11 includes a substrate body 43, grooves 47, and a metal thin film 45 (see FIG. 3A).

Figure 3B:
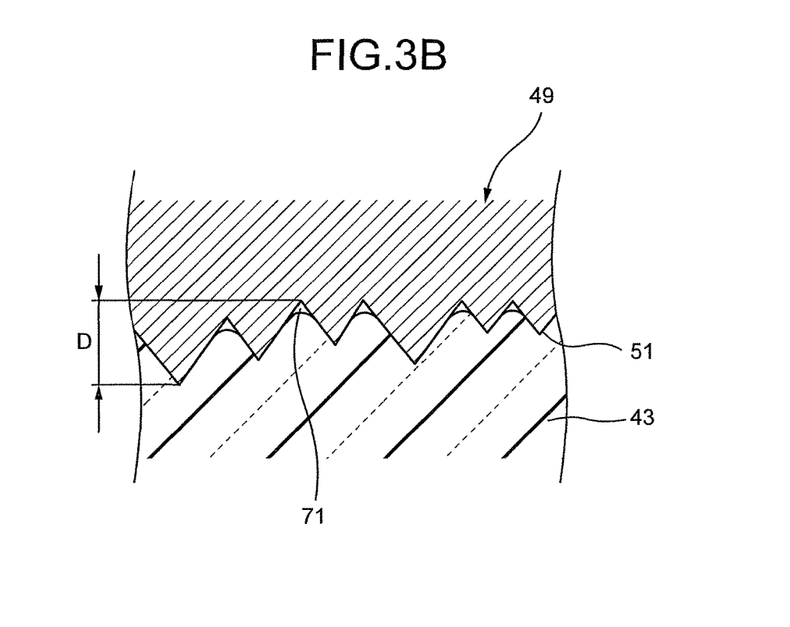
FIG. 3B is a cross-sectional view schematically illustrating a die mark-molding-face and a resin material.

The substrate body 43 according to this embodiment is made of a disk-shaped synthetic resin material, and a radial line mark region 53 is molded by a die mark-molding-face 51 of a molding die 49 illustrated in FIG. 3B. A disk-shaped central disk portion 55 is provided inside the substrate body 43, and the central disk portion 55 includes a shaft hole 57 at a center C through which a rotation shaft 37 of a pointer 35 penetrates.

The substrate body 43 has an annular radial line mark region 53 that is continuously provided at the outside of a central disk portion 55. The substrate body 43 has mark protrusions 59 that protrude at predetermined intervals in a circumferential direction of the radial line mark region 53. The substrate body 43 is molded by a transparent resin material and acts as a light guide plate. Therefore, light guided from a light source (not illustrated) is emitted from a protruding end face of the mark protrusion 59. The outside of the radial line mark region 53 becomes a marked inclination plane 61. The substrate body 43 is configured in such a manner that a ring-shaped frame wall portion 63 with steep slope is continuously provided at the outside of the marked inclination plane 61. The substrate body 43 is configured in such a manner that an inverse inclination plane, which is inclined downward to the outside, is continuously provided at the further outside of the frame wall portion 63. The inverse inclination plane becomes a peripheral dial plate 67 that is provided with speed characters 65 at predetermined intervals.

The radial line mark region 53 of this embodiment is provided on the surface of the substrate body 43 at least in the form of ring around the shaft hole 57. Here, the meanings of "provided at least in the form of ring" is that the radial line pattern may attached also including the central disk portion 55.

As illustrated in FIG. 2B, the grooves 47 according to this embodiment extend radially outward in a radial direction from the center C of the radial line mark region 53 without intersecting with each other. The grooves 47 include a plurality of fine grooves and are disposed such that a distance (distance P at a groove bottom) is 2 µm or less (preferably, approximately 1 µm) between the grooves in an outermost peripheral end 54. In this embodiment, the grooves 47 are formed such that the distance is 1 µm or less in the outermost peripheral end 54, so that the radial line pattern is given to the radial line mark region 53. These grooves 47 are formed by being transferred from the die mark-molding-face 51 of the molding die 49. The lower limit value of the distance P between the plurality of grooves 47 in the outermost peripheral end 54 may be typically any value within a manufacturing range, for example, is 0.1 µm or more.

With respect to the grooves 47 according to this embodiment, the adjacent grooves are different from each other in depth. In the radial line dial plate 11, when the grooves 47 are different in depth, the radial line pattern appears at random, and a metallic-tone surface becomes more real. In the radial line dial plate 11, the center C of the substrate body 43 is positioned on an extension line all of these grooves 47 (see FIG. 2B). In this configuration, the ring-shaped substrate body 43 not having the center portion is exemplified, but when the substrate body 43 is a disk-shaped part, each of the grooves 47 is converged by extending to the center C of the substrate body 43.

A depth D of a die groove 71 of the die mark-molding-face 51 illustrated in FIG. 3B is randomly 1 µm as a maximum value. Specifically, when the substrate body 43 is molded by a resin in the die mark-molding-face 51 and the grooves 47 of the radial line dial plate 11 covered by an undercoat 69 to be described below and the metal thin film 45 is measured, the grooves 47 illustrated in FIG. 3A have a depth "d" of 0.024 to 0.437 (this measurement value is obtained in a part of the radial line mark region 53). From this fact, it is considered that the depth D of the die groove 71 of the die mark-molding-face 51 change into 1 µm or less. Typically, the lower limit value of the depth D of the die groove 71 may be any value within a manufacturing range, for example, is 0.1 µm or more.

In this embodiment, the radial line pattern is transferred from the die mark-molding-face 51. The die mark-molding-face 51 is not formed by etching, buffing, polishing, or the like. The reason is that reproducibility of the radial line pattern is ensured by this, whereby the molding die 49 can be massively produced.

Then, a plurality of molding dies 49 are manufactured for each production base. At this time, processing information of manufacturing the molding die is stored in a processing machine as common processing data. As the processing machine, for example, NC (Numerical Control) milling machine can be used. As a tool for micro grooving, for example, an ultra-precision diamond cutting tool can be used. This kind of ultra-precision diamond cutting tool can perform ultra-micro grooving of several hundreds of nm. As a result, the ultra-micro grooving can be performed on electroless nickel plating or copper, aluminum, and the like which is a precision plastic molding material. The processing data is obtained by digitization of, for example, a position of a die material or movement of a main shaft. Thus, the radial line marks are formed even in the die mark-molding-face 51 of any molding die 49 with a uniform quality.

In addition, the substrate body 43 is molded using a resin material having superior transferability. The excellent transferability of the resin material depends on fluidity performance. When the fluidity is high, since the resin material is filled in a die shape with no clearance during molding, it is possible to obtain a molded product which follows the die shape. Meanwhile, when the resin material is low in fluidity, the resin material is solidified in a state of insufficient filling, resulting in a molded product that does not follow the die shape.

The substrate body 43 is typically molded using a resin material having transferability that is high to the extent of faithfully transferring a desired shape to the surface of the substrate body 43 such that the grooves 47 constituting the radial line pattern as described above can be intentionally formed on the surface of the substrate body 43. As the resin material having the fluidity, a thermoplastic resin such as a cycloolefin polymer (COP) resin can be suitably used. Thus, the radial line pattern formed on the die mark-molding-face 51 can be faithfully transferred to the radial line mark region 53 of the substrate body 43 by the resin material to be injected into the molding die 49.

The metal thin film 45 according to this embodiment is deposited on at least radial line mark region 53 of the substrate body 43. The radial line mark region 53 can be finished to be a metallic tone in such a manner the metal thin film 45 is applied to an annular flat portion, which is a resin molded portion transferred with the radial line marks formed on the die mark-molding-face 51. Here, aluminum has conventionally been used as a film forming metal, but titanium is used in this configuration. In order to increase adhesion of the substrate body 43 and the titanium, before the titanium film is formed, the undercoat 69 illustrated in FIG. 3A is coated on the region of the substrate body 43 in which the radial line marks are applied. That is, the metal thin film 45 made of a titanium thin film is formed through the undercoat 69 on the radial line region in which the radial line marks are applied. The titanium thin film is formed by vapor deposition.

The thickness of the metal thin film 45 is preferably in the range of 0.001 to 1 µm. Thus, a metallic-tone surface having more real feeling can be more reliably expressed in the radial line marks.

In this embodiment, the titanium thin film is used as the metal thin film 45, but other metals, for example, aluminum, stainless steel, gold, silver, platinum, copper, zinc, nickel, chromium, tin, and molybdenum are used for the metal thin film 45 without being hindered in the radial line dial plate 11 according to the present invention. In particular, as will be described below, when there is no need to consider corrosion in a chloride solution, it is possible to obtain the same effect as that of this configuration even in the case of using stainless steel. In addition, when matte or the like is required for metallic-tone feeling, an aluminum thin film of a passive film formed with aluminum oxide may be formed on the radial line marks. However, even in this case, requirements are that a topcoat layer is not provided. This is because the topcoat is not followed into a groove shape of the formed marks and the notice of the topcoat is suppressed by reflection of external light.

Then, operation of the radial line dial plate 11 having the above-described configuration will be described.

According to the radial line dial plate 11 of this embodiment, the radial line mark region 53 transferred from the die mark-molding-face 51 of the molding die 49 is molded on the surface of the substrate body 43 made of resin. Numerous fine grooves 47 are applied radially to the radial line mark region 53 without intersecting with each other. That is, the grooves 47 of the marks are orderly disposed by extending radially outward from the center C in a linear manner without intersecting with each other.

Figure 4:
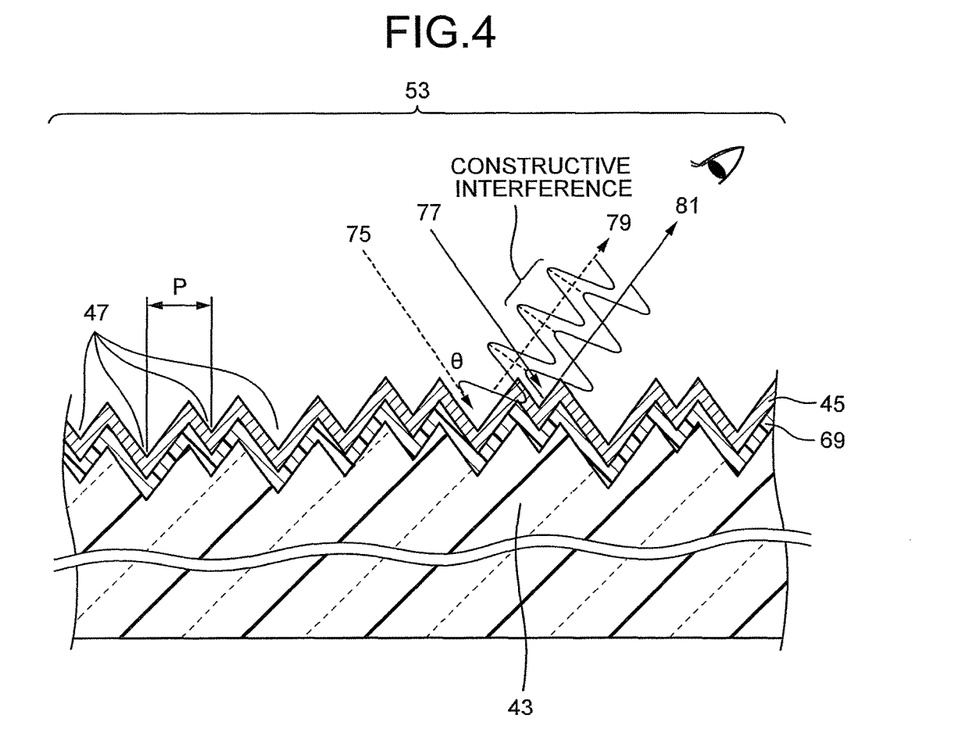
FIG. 4 is an action diagram illustrating interference of light in a radial line mark region illustrated in FIG. 3A.

As illustrated in FIG. 4, the external light is reflected at a reflection angle θ by the fine grooves 47 and reaches human eyes. The fine grooves 47 extending radially are configured such that the distance therebetween (pitch P) is 1 µm or less in the outermost peripheral end 54. Thus, for example, external light 75 and external light 77 are reflected by the respective grooves 47, whereby reflective light 79 and reflective light 81 are obtained and interfere with each other, thereby appearing as a rainbow pattern. When the distance between the grooves 47 is defined as a pitch P and a wavelength of the external light is defined as λ, constructive interference of the two reflective light is established under condition of Psinθ=mλ (where, m is an integer).

Figure 7:
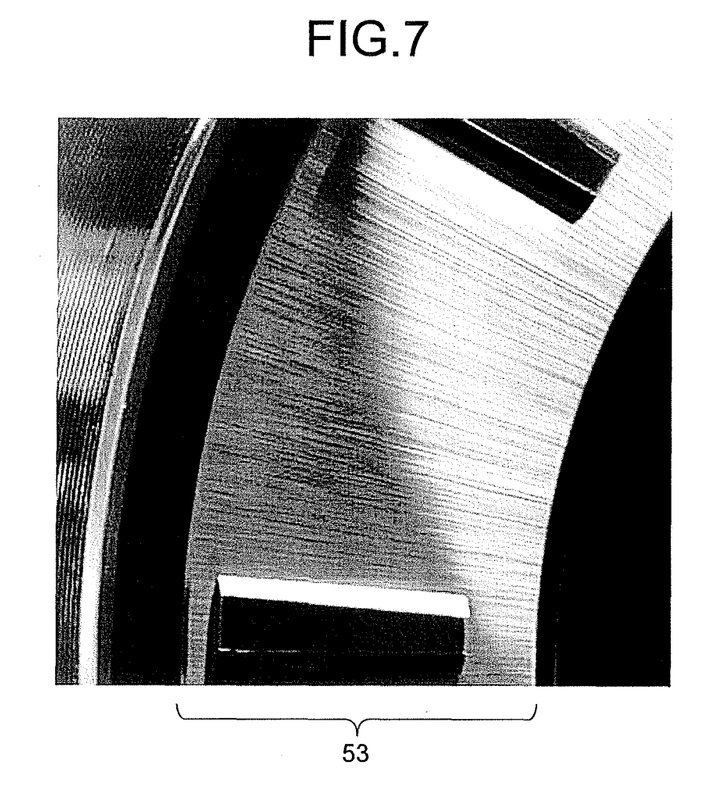
FIG. 7 is a partially enlarged photograph of a radial line dial plate attached with a radial line pattern according to a first embodiment.

That is, when the difference between paths is an integral multiple of the wavelength, the reflective light 79 and the reflective light 81 are propagated by synchronization between a mountain and a mountain and between a valley and a valley, and thus constructive interference of the external light 75 and the external light 77 occurs. In fact, various types of reflective light having various reflection angles come into sight. FIG. 4 illustrates an example thereof. Accordingly, in the radial line mark region 53 as illustrated in FIG. 7, different glossy colors appear for each groove. In addition, the glossy color is also varied for each groove when a viewing angle is changed. The fine and parallel grooves 47 extending radially is seen as a rainbow-colored pattern even when the distance between the grooves 47 is in the vicinity of 1.5 to 2.0 µm.

Figure 5:
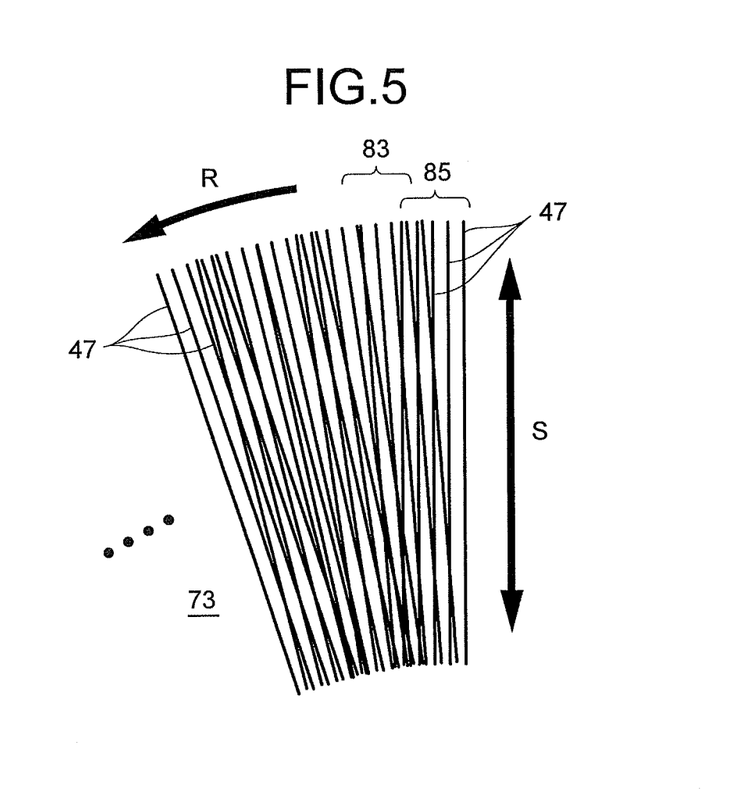
FIG. 5 is a partially enlarged elevation view schematically illustrating a mark stroke direction of a brush of a metallic dial plate according to a comparative example.
Figure 6:
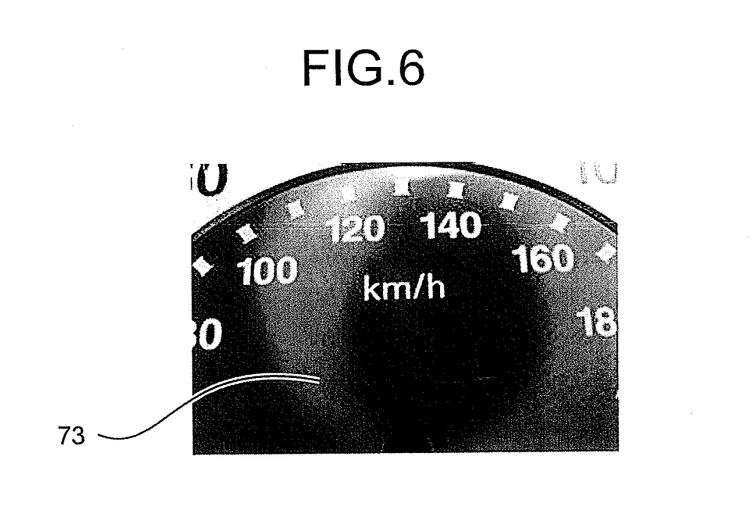
FIG. 6 is a partially enlarged photograph of the metallic dial plate according to the comparative example.

On the other hand, marking are performed on a metallic dial plate 73 according to Comparative Example illustrated in FIG. 5 by a brush (not illustrated). In the marking by the brush, the brush is stroked in a direction closer to the center of the metallic dial plate 73, and the fine grooves 47 are formed on the surface. At the same time, the metallic dial plate 73 rotates in a direction indicated by the arrow R. That is, after the brush is stroked, the metallic dial plate 73 rotates at very small angle, and the subsequent stroke is performed. For this reason, a plurality of marks (grooves 47) corresponding to a width of the brush are applied at the same time with a single stroke S. The marking due to a previous stroke 83 is marking on a straight line directed to the center of the metallic dial plate 73, which is the same as in a next stroke 85. Therefore, numerous intersection points appear through the marking of the previous stroke 83 and the next stroke 85. In this way, when the intersection of the grooves 47 occurs in numerous points, interference of light does not occur, and white gloss appears as illustrated in FIG. 6.

In contrast, according to the radial line dial plate 11 of this embodiment, when the distance is 1 µm or less in the outermost peripheral end 54, the interference of light occurs, and thus it is possible to obtain rainbow-colored gloss as illustrated in FIG. 7. In particular, when the distance between the grooves 47 is 1 µm or less in the outermost peripheral end 54, the feeling of metallic tone is more effectively enhanced.

Furthermore, in the radial line dial plate 11 according to this embodiment, the adjacent grooves 47 are different from each other in depth, and each of the adjacent grooves 47 reflects the light to form the reflective light having a different wavelength, whereby uncomfortable feeling of regularity in appearance gloss is suppressed. Thus, the radial line pattern appears randomly, and it is obtain metal feeling that is more real.

Furthermore, since the radial line dial plate 11 according to this embodiment is molded by the resin material such as the cycloolefin polymer (COP) resin that is excellent in transferability, the fine die grooves 71 of the radial line marks formed on the die mark-molding-face 51 of the molding die 49 can be faithfully reproduced as the fine grooves 47 in the substrate body 43 which is a molded resin product.

Then, in the automobile meter provided with the radial line dial plate 11 according to this embodiment, since the white gloss for reducing the metallic-tone feeling does not appear and the radial line pattern has the rainbow-colored gloss, viewers can receive an impression of high-grade feeling.

The features of the above-described radial line dial plate and the automobile meter provided with the radial line dial plate according to the present invention will be concisely summarized below:

[1] A radial line dial plate 11 including: a substrate body 43 made of resin on which a radial line mark region 53 is molded by a die mark-molding-face 51 of a molding die 49; a plurality of fine grooves 47 that extend radially outward in a radial direction from a center C of the radial line mark region 53 without intersecting with each other and are formed such that a distance therebetween is 1 µm or less at an outermost peripheral end 54 to give a radial line pattern to the radial line mark region 53; and a metal thin film 45 that is deposited to at least the radial line mark region 53 of the substrate body 43.

[2] The radial line dial plate 11 according to the above feature [1], wherein the grooves 47 are configured such that a depth between adjacent grooves 47 is different.

[3] The radial line dial plate 11 according to the above feature [1] or [2], wherein the substrate body 43 is molded by a resin material having excellent transferability.

[7-1] An automobile meter (speedometer) 17 provided with the radial line dial plate 11 according to any one of the above features [1] to [3].

Accordingly, according to the radial line dial plate 11 and the speedometer 17 provided with the radial line dial plate 11, it is possible to provide the radial line dial plate 11 and the speedometer 17 provided with the radial line dial plate 11, which gives appearance as if being manufactured by cutting a real metal to a viewer although being a molded resin product and can be obtained at lower cost compared to a metal cutting product.

The present invention is not limited to the above-described embodiment, and various changes, modifications, or the like can be made as appropriate. Moreover, the material, shape, dimensions, number, location, and the like of each constituent element in the above-described embodiment are optional and no limitations are imposed on them as long as the invention can be implemented.

Second Embodiment

Next, a radial line dial plate and an automobile meter provided with the radial line dial plate according to a second embodiment of the present invention will be described with reference to FIGS. 8A to 13. The radial line dial plate and the automobile meter provided with the radial line dial plate according to the second embodiment differs from those in the first embodiment in that an undercoat is not provided. The following description is given with reference to FIGS. 1A and 2A as appropriate, and the description of a configuration, an action, and an effect similar to those of the above-described embodiment are not presented as much as possible.

A radial line dial plate 211 according to this embodiment is used in a speedometer 17, a tachometer 21, a fuel gauge 19, and a water temperature gauge 23 which are automobile meters in the vehicle combination meter 13. In this embodiment, the radial line dial plate 211 used in the speedometer 17 will be described below as an example.

Figure 8A:
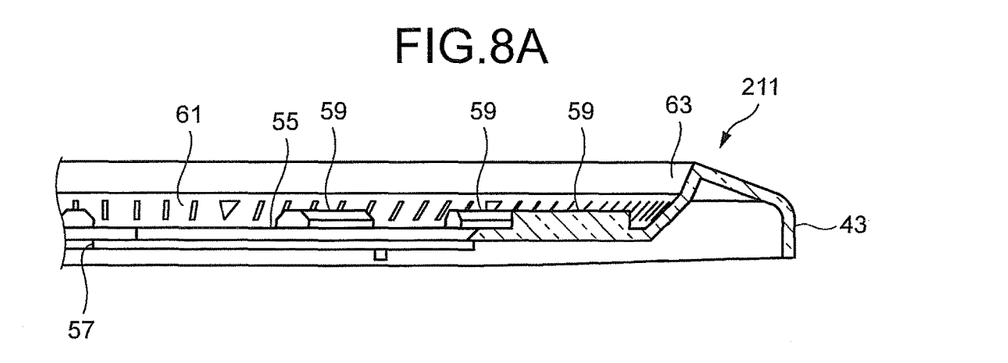
FIG. 8A is a cross-sectional view taken along line D-D in FIG. 2A.
Figure 8B:
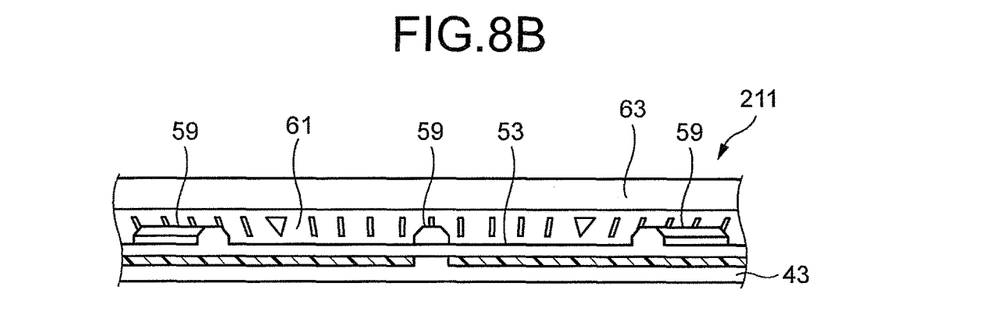
FIG. 8B is a cross-sectional view taken along line E-E in FIG. 2A.

The radial line dial plate 211 includes a substrate body 43 made of synthetic resin (see FIGS. 8A and 8B) that is integrally molded by a molding die (see FIG. 9C) and a metal thin film 245 (see FIG. 9B) that is at least deposited on a radial line mark region 53 provided on the surface of the substrate body 43 to form a reflective surface. As described above, the substrate body 43 is made of a disk-shaped transparent synthetic resin material, and has a center C through which a shaft hole 57 is bored, as illustrated in FIGS. 2A, 8A, and 8B. A rotation shaft 37 (see FIG. 1B or the like) of a pointer 35 (see FIG. 1B or the like) penetrates into the shaft hole 57.

Then, the radial line mark region 53 according to this embodiment extends in a radial direction from the center C of the substrate body 43, and is formed into a radial line pattern shape by a large number of (a plurality of) groove portions 247 (corresponding to the grooves 47 in the first embodiment) which are random in groove depth, respectively. The large number of these groove portions 247 are formed to radially extend in such a manner of being transferred from a die mark-molding-face 273 of an upper die 271 in a molding die, as illustrated in FIG. 9C.

Figure 9A:
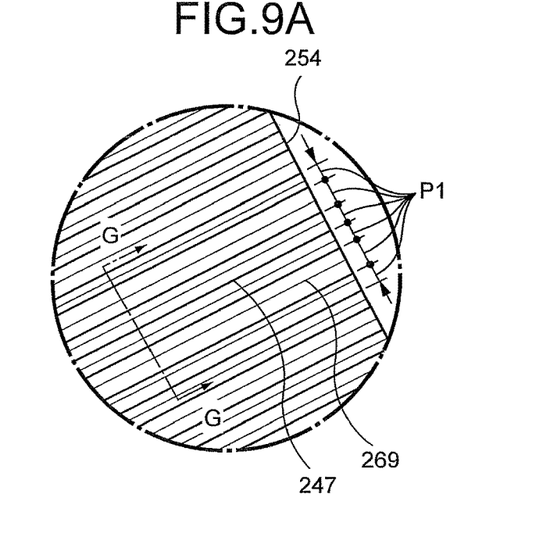
FIG. 9A is a partially enlarged view of a radial line pattern in a case where a pitch of groove portions is random in an F-portion in FIG. 2A.
Figure 9B:
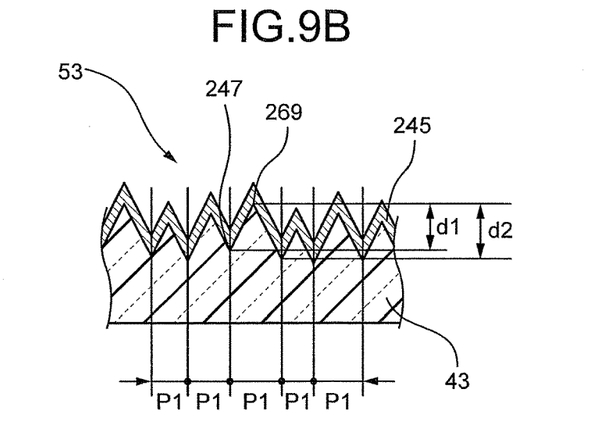
FIG. 9B is a cross-sectional view taken along line G-G in FIG. 9A.
Figure 9C:
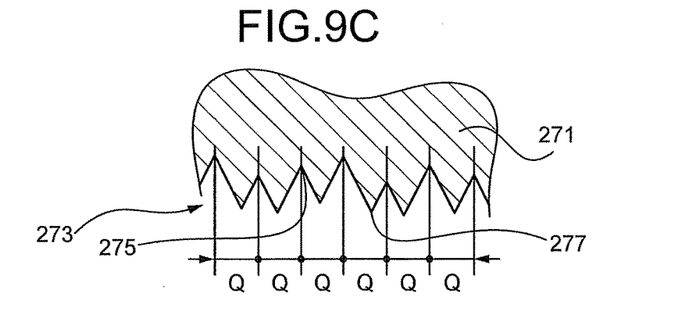
FIG. 9C is a partially enlarged cross-sectional view illustrating a die mark-molding-face of a molding die for transferring and molding groove portions and mountain portions in FIG. 9B.

The large number of these groove portions 247 according to this embodiment are formed to radially extend in such a manner that a pitch P1 (corresponding to the distance P between the grooves at the bottom as described above) is random in a circumferential direction at an outermost peripheral end 254, which is an outer edge portion of the substrate body 43, as illustrated in FIG. 9A and a depth d1 or d2 (corresponding to the depth "d" described above) of each groove is random as illustrated in FIG. 9B. For example, the pitch P1 of the groove portions 247 at the outermost peripheral end 254 can be randomly 1 μm as a maximum value or less. In addition, the groove portions 247 are randomly formed with the groove depth d1 or d2 of 1 μm as a maximum value or less. Mountain portions 269 are formed between these groove portions 247 that radially extend.

Then, a metal thin film 245 is deposited in the radial line mark region 53 with a uniform thickness in accordance with the groove portions 247 and the mountain portions 269 to form a reflective surface. The metal thin film 245 is deposited in the radial line mark region 53 by, for example, sputtering, vapor deposition, plating, or painting.

The lower limit value of the pitch P1 of the groove portions 247 at the outermost peripheral end 254 may be typically any value within a manufacturing range, for example, is 0.1 μm or more. Similarly, the lower limit value of the groove depth d1 or d2 of the groove portions 247 may be typically any value within a manufacturing range, for example, is 0.1 μm or more.

Figure 10A:
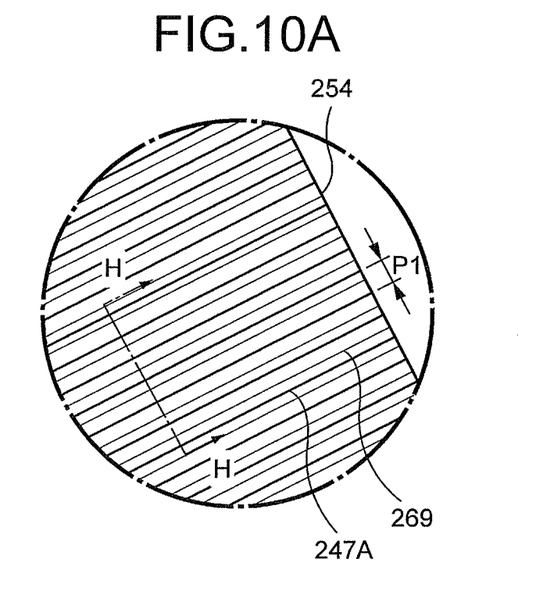
FIG. 10A is a partially enlarged view illustrating a modification example of a radial line pattern in a case where a pitch of groove portions is constant in an F-portion in FIG. 2A.
Figure 10B:
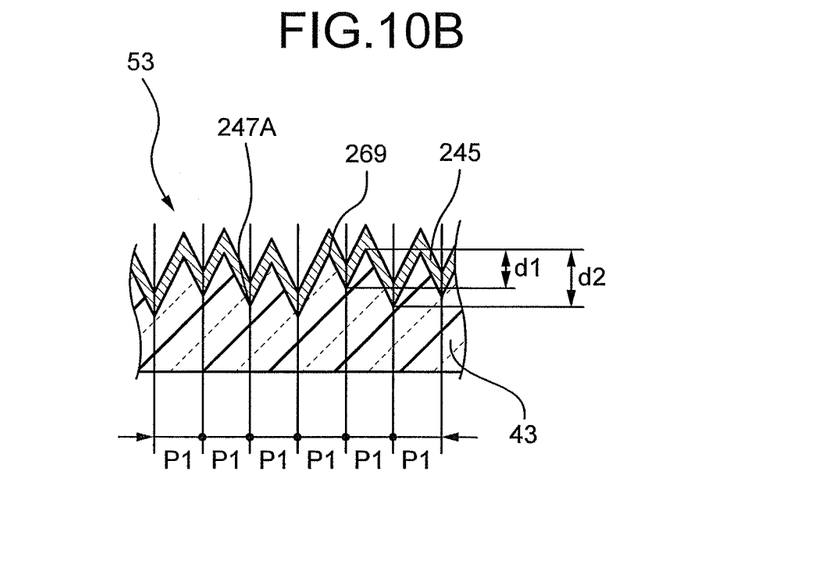
FIG. 10B is a cross-sectional view taken along line H-H in FIG. 10A.

In addition, similarly to a modification example of this embodiment illustrated in FIG. 10A, a large number of groove portions 247A may be formed to radially extend in such a manner that a pitch P1 is constant in a circumferential direction at an outermost peripheral end 254 of the substrate body 43 and a depth d1 or d2 of each groove is random as illustrated in FIG. 10B. At this time, the pitch P1 of the groove portions 247A at the outermost peripheral end 254 can be, for example, about 1 μm. Naturally, the pitch of the groove portions of the present invention is not limited to 1 μm.

Then, similarly to the above-described molding die 49, a plurality of molding dies (for example, the above-described upper die 271) used to mold the substrate body 43 are manufactured for each production base. At this time, processing information of manufacturing the molding die is stored in a processing machine as common processing data. As the processing machine, for example, NC (Numerical Control) milling machine can be used. The processing data is obtained by digitization of, for example, a position of a die material or movement of a main shaft. Thus, the groove portions 247 of the radial line mark region 53 in the substrate body 43 is formed into a uniform shape even when being transferred from the die mark-molding-face 273 of the upper die 271 in an arbitrary molding die.

In addition, as described above, the substrate body 43 of the radial line dial plate 211 is molded using a flowable synthetic resin that is excellent in transferability. As the synthetic resin excellent in transferability, a thermoplastic resin such as a cycloolefin polymer (COP) resin can be suitably used. Thus, the radial line pattern formed on the die mark-molding-face 273 can be faithfully transferred to the radial line mark region 53 of the substrate body 43 by the synthetic resin for forming the substrate body 43.

Then, operation of the radial line dial plate 211 having the above-described configuration will be described.

According to the radial line dial plate 211 of this embodiment, the radial line mark region 53 transferred from the die mark-molding-face 273 of the upper die 271 in the molding die is molded on the surface of the substrate body 43 made of a resin. In the radial line mark region 53, the groove portions 247 are formed by convex portions 277 (see FIG. 9C) provided on the die mark-molding-face 273, and the mountain portions 269 are formed by concave portions 275 (see FIG. 9C) provided on the die mark-molding-face 273.

A large number of concave portions 275 provided radially on the die mark-molding-face 273 of the upper die 271 are formed in such a manner that a cutting blade reciprocated such that a cutting depth is random while the upper die 271 is fed in a circumferential direction at a constant pitch Q (see FIG. 9C), for example. Here, the random depth represents a state where the depth is different at random without being uniform. Therefore, the die mark-molding-face 273 is formed with the large number of concave portions 275 that extend radially at a constant pitch Q and a random depth and the large number of convex portions 277 that are formed between the concave portions 275 at a pitch (corresponding to the pitch P1 of the groove portions 247) that is random.

That is, the concave portions 275 are formed on the die mark-molding-face 273 of the upper die 271 in the molding die for transferring and molding the radial line mark region 53 on the surface of the substrate body 43 to form the mountain portions 269, at the constant pitch Q. Therefore, it is possible to perform cutting on the concave portions 275 formed on the die mark-molding-face 273 at the constant pitch Q, thereby easily machining the die mark-molding-face 273.

Then, with respect to the large number of groove portions 247 that are transferred and molded by the convex portions 277 on the die mark-molding-face 273 of the upper die 271 in the radial line mark region 53 of the substrate body 43 and radially extend, the pitch P1 becomes random in the circumferential direction at the outermost peripheral end 254 of the substrate body 43 as illustrated by thick solid lines in FIG. 9A, and the depth d1 or d2 of each groove becomes random as illustrated in FIG. 9B. With respect to the large number of mountain portions 269 that are transferred and molded by the concave portion 275 on the die mark-molding-face 273 in the radial line mark region 53 of the substrate body 43 and radially extend, the pitch becomes constant in the circumferential direction at the outermost peripheral end 254 of the substrate body 43 as illustrated by thin solid lines in FIG. 9A.

Processing information of the concave portions 275 on the die mark-molding-face 273 which forms the random depth d1 or d2 of each groove is stored in a storage portion of the processing machine. That is, the concave portions 275 on the die mark-molding-face 273 constituted by the random depth d1 or d2 of each groove are formed to have reproducibility.

In addition, as illustrated in FIGS. 10A and 10B, when the groove portions 247A are formed in such a manner that the pitch P1 is constant in the circumferential direction at the outermost peripheral end 254 of the substrate body 43 and the depth d1 or d2 of each groove is random, the concave portions 275 of the random pitch Q and depth and the convex portions 277 formed between the concave portions 275 to have the constant pitch (corresponding to the pitch P1 of the groove portions 247A) are formed on the die mark-molding-face 273. However, the pitch Q and depth of the concave portions 275 are set to pre-calculated values such that the pitch of the convex portions 277 formed between the concave portions 275 is constant.

Figure 11A:
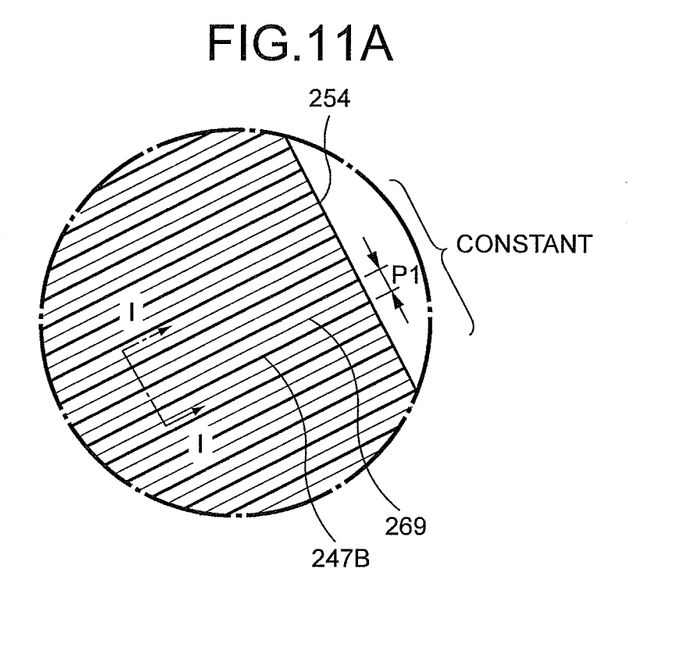
FIG. 11A is a partially enlarged view of a radial line pattern according to a comparative example in a case where a pitch and each groove depth of groove portions are constant.
Figure 11B:
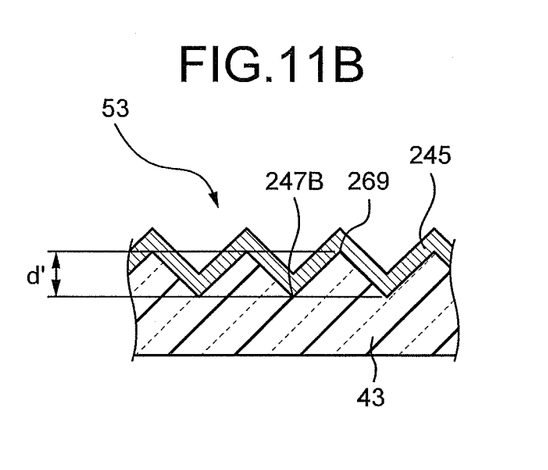
FIG. 11B is a cross-sectional view taken along line I-I in FIG. 11A.

A radial line dial plate sample according to this embodiment in which the large number of groove portions 247 extending radially are random in pitch P1 and depth d1 or d2 of each groove as illustrated in FIGS. 9A and 9B and a radial line dial plate according to the comparative example in which the large number of groove portions 247B extending radially are constant in pitch P1 and depth d' of each groove as illustrated in FIGS. 11A and 11B were prepared, and the radial line mark region 53 of each sample was visually determined.

Figure 12:
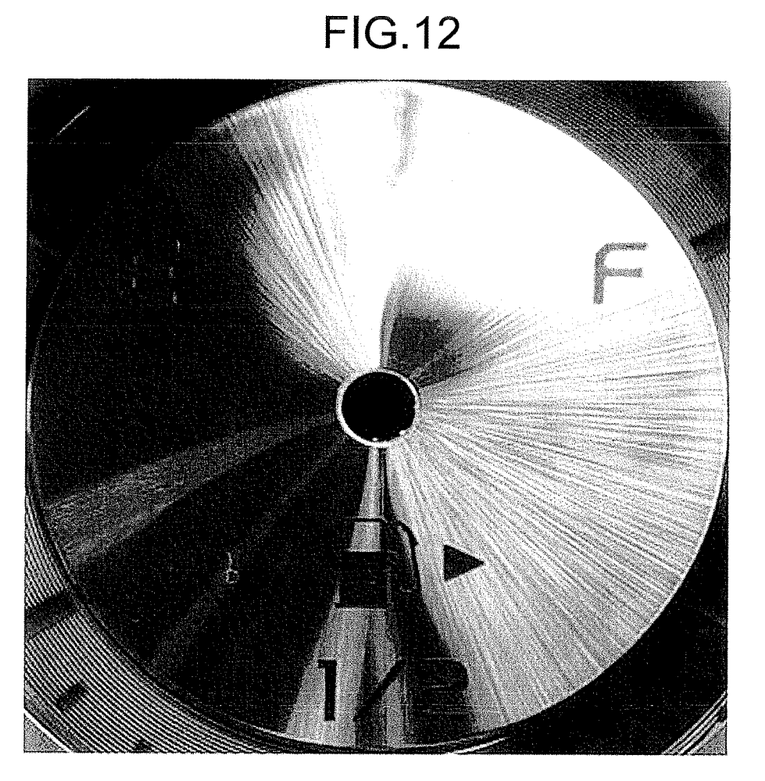
FIG. 12 is an elevation photograph of a radial line dial plate sample according to an embodiment of the present invention in which a pitch of groove portions is constant and each groove depth is random.
Figure 13:
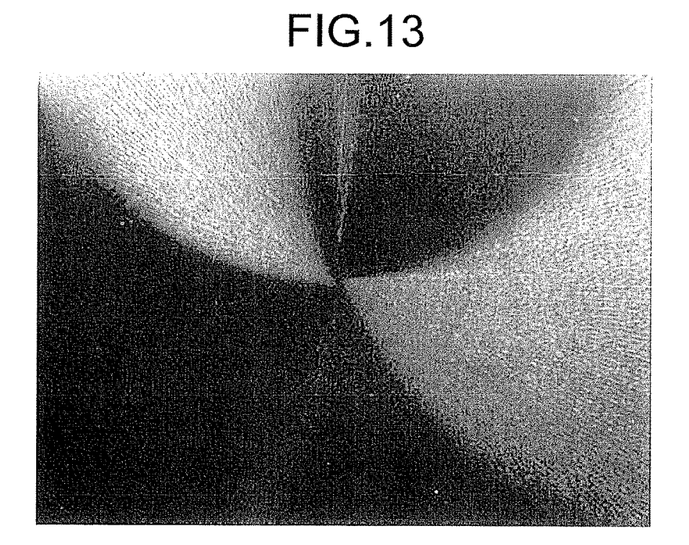
FIG. 13 is a partially enlarged elevation photograph of a radial line dial plate sample according to the comparative example in which a pitch and each groove depth of groove portions is constant.

In the case of the radial line dial plate sample according to this embodiment in which the groove portions 247 extending radially are random in pitch P1 and depth d1 or d2 of each groove, as illustrated in FIG. 12, it was approximated to the radial line pattern applied to a real metal plate. In contrast, in the case of the radial line dial plate sample according to the comparative example in which the large number of groove portions 247B extending radially are constant in pitch P1 and depth d' of each groove, as illustrated in FIG. 13, the radial line pattern appeared at non-random and metallic-tone appearance of the radial line pattern was inferior compared to the radial line dial plate sample of this embodiment illustrated in FIG. 12.

The radial line marking treatment on the metal surface by the brush is to form the groove portions having different depth and pitch on the surface by each fiber of the brush. Therefore, the radial line pattern applied to the real metal plate gives off gloss at random.

That is, as in the radial line dial plate sample according to the comparative example illustrated in FIGS. 11A and 11B, when the depth d' of the groove in the groove portions 247B is constant, the radial line mark region 53 has uniform gloss, and non-uniformity does not come out in the sense that the metal surface is scratched with the brush. In contrast, as in the radial line dial plate sample according to this embodiment illustrated in FIGS. 9A and 9B, different-colored glossy appears for each groove in the radial line mark region 53 in which the depth d1 or d2 of the groove in the groove portions 247 is random. As a result, it is possible to give the viewer impression close to the marking treatment of the metal surface by the brush.

In addition, as described above, the die mark-molding-face 273 in the upper die 271 of the molding die for transferring and molding the radial line mark region 53 to the surface of the substrate body 43 is processed into the same shape by common processing information stored in the storage portion of the processing machine. Thus, even when using any molding die out of the plurality of molding dies, it is possible to obtain the radial line dial plate 211 with a uniform quality such that the radial line mark region 53 has the same radial line pattern.

Furthermore, in the radial line dial plate 211 of this embodiment, the groove portions 247 of the radial line mark region 53 are formed at random to have the depth d1 or d2 of 1 μm as the maximum value or less. Thus, different-colored gloss appears for each groove, and thus the gloss appears at random. As a result, uncomfortable feeling as the radial line pattern of the metallic tone with respect to the radial line pattern applied to a real metal plate hardly occurs.

Accordingly, the impression of the radial line dial plate 211 close to the marking treatment of the metal surface is given to the viewer, and thus it is possible to obtain an automobile meter (speedometer 17 herein) with high-grade feeling.

The features of the embodiment of the above-described radial line dial plate and the automobile meter provided with the radial line dial plate according to the present invention will be concisely summarized below:

[4] A radial line dial plate 211 including: a substrate body 43 made of resin that is integrally molded by a molding die; and a metal thin film 245 that is deposited to at least the radial line mark region 53 provided on a surface of the substrate body 43, wherein the radial line mark region 53 extends in a radial direction from a center C of the substrate body 43 and is formed into a radial line pattern shape by a large number of groove portions 247 which are random in groove depth d1 or d2, respectively.

[5] The radial line dial plate 211 according to the above feature [4], wherein the groove portions 247 are randomly formed to have a groove depth d1 or d2 of 1 μm as a maximum value or less.

[6] The radial line dial plate 211 according to the above feature [4] or [5], wherein a large number of mountain portions 269 formed between the groove portions 247 are formed at a constant pitch.

[7-2] An automobile meter (speedometer) 17 provided with the radial line dial plate 211 according to any one of the above features [4] to [6].

Therefore, according to the radial line dial plate 211 and the speedometer 17 provided with the radial line dial plate 211, it is possible to provide the lightweight and inexpensive radial line dial plate 211 and the speedometer 17 provided with the radial line dial plate 211, which can obtain appearance with a uniform quality as if a radial line pattern is applied to a real metallic plate while being a molded resin product.

The present invention is not limited to the above-described embodiment, and various changes, modifications, or the like can be made as appropriate. Moreover, the material, shape, dimensions, number, location, and the like of each constituent element in the above-described embodiment are optional and no limitations are imposed on them as long as the invention can be implemented.

According to a radial line dial plate and an automobile meter provided with the radial line dial plate according to the present invention, it is possible to provide the radial line dial plate and the automobile meter provided with the radial line dial plate, which gives appearance as if being manufactured by cutting a real metal to a viewer while being a molded resin product and can be obtained at lower cost compared to a metal cutting product.

According to the radial line dial plate and the automobile meter provided with the radial line dial plate according to the present invention, it is possible to provide a lightweight and inexpensive radial line dial plate and an automobile meter provided with the radial line dial plate, which can obtain appearance as if a radial line pattern is applied to a real metallic plate while being a molded resin product with a uniform quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radial line dial plate comprising:
    a substrate body made of resin on which a radial line mark region is molded by a die mark-molding-face of a molding die;
    a plurality of fine grooves that extend radially outward in a radial direction from a center of the radial line mark region without intersecting with each other and are formed such that a distance therebetween is 1 μm or less at an outermost peripheral end to give a radial line pattern to the radial line mark region; and
    a metal thin film that is deposited to at least the radial line mark region of the substrate body.

2. The radial line dial plate according to claim 1, wherein the grooves are configured such that a depth between adjacent grooves is different.

3. The radial line dial plate according to claim 2, wherein the substrate body is molded by a resin material having excellent transferability.

4. An automobile meter provided with the radial line dial plate according to claim 2.

5. The radial line dial plate according to claim 1, wherein the substrate body is molded by a resin material having excellent transferability.

6. An automobile meter provided with the radial line dial plate according to claim 5.

7. An automobile meter provided with the radial line dial plate according to claim 1.

8. A radial line dial plate comprising:
    a substrate body made of resin that is integrally molded by a molding die; and
    a metal thin film that is deposited to at least a radial line mark region provided on a surface of the substrate body, wherein
    the radial line mark region extends in a radial direction from a center of the substrate body and is formed into a radial line pattern shape by a large number of groove portions which are random in groove depth, respectively.

9. The radial line dial plate according to claim 8, wherein the groove portions are randomly formed to have a groove depth of 1 μm as a maximum value or less.

10. The radial line dial plate according to claim 9, wherein a large number of mountain portions formed between the groove portions are formed at a constant pitch.

11. An automobile meter provided with the radial line dial plate according to claim 9.

12. The radial line dial plate according to claim 8, wherein a large number of mountain portions formed between the groove portions are formed at a constant pitch.

13. An automobile meter provided with the radial line dial plate according to claim 12.

14. An automobile meter provided with the radial line dial plate according to claim 8.

* * * * *